(12) United States Patent
Shi et al.

(10) Patent No.: US 11,681,134 B2
(45) Date of Patent: Jun. 20, 2023

(54) TUBE SYSTEM

(71) Applicant: Carl Zeiss Microscopy GmbH, Jena (DE)

(72) Inventors: Renhu Shi, Göttingen (DE); Marco Hanft, Jena (DE); Thomas Nobis, Jena (DE); Peter Schnuell, Gleichen (DE); Johannes Knoblich, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 321 days.

(21) Appl. No.: 16/934,862

(22) Filed: Jul. 21, 2020

(65) Prior Publication Data
US 2021/0033839 A1 Feb. 4, 2021

(30) Foreign Application Priority Data

Jul. 30, 2019 (DE) .......................... 102019211360.5

(51) Int. Cl.
*G02B 21/02* (2006.01)
(52) U.S. Cl.
CPC .................... *G02B 21/02* (2013.01)
(58) Field of Classification Search
CPC .... G02B 21/02; G02B 13/00; G02B 27/0025; G02B 1/00; G02B 27/0062; G02B 9/12
See application file for complete search history.

(56) References Cited

U.S. PATENT DOCUMENTS

| 10,359,612 B2 * | 7/2019 | Nobis | G02B 21/361 |
|---|---|---|---|
| 2008/0247050 A1 * | 10/2008 | Shi | G02B 21/02 |
| | | | 359/660 |
| 2009/0284841 A1 * | 11/2009 | Shi | G02B 21/02 |
| | | | 359/656 |
| 2010/0172029 A1 | 7/2010 | Nakayama | |
| 2015/0043064 A1 * | 2/2015 | Shi | G02B 27/0062 |
| | | | 359/368 |
| 2016/0062111 A1 * | 3/2016 | Nobis | G02B 13/0095 |
| | | | 359/368 |
| 2019/0121110 A1 * | 4/2019 | Miyazaki | G02B 21/361 |

FOREIGN PATENT DOCUMENTS

| DE | 10 2005 051 026 A1 | 5/2007 |
| WO | WO 2005/088378 A1 | 9/2005 |

OTHER PUBLICATIONS

Image/Object Relationship, 2017, pp. 1-5 [online], [retrieved Feb. 1, 2013], retrieved from the Internet <URL: http://www.tpub.com/photography1/ph20924.htm >. (Year: 2017).*
German Search Report, with translation thereof, for corresponding DE Appl No. 10 2019 211 360.5, dated Mar. 16, 2020.
Kingslake and Johnson, "Lens Design Fundamentals," SPIE Press, pp. 70-71, 2010.

* cited by examiner

*Primary Examiner* — Thomas K Pham
*Assistant Examiner* — Wesley Scott Ashton
(74) *Attorney, Agent, or Firm* — Fish & Richardson P.C.

(57) ABSTRACT

A tube system for a microscope includes two lenses and a glass element. The tube system can have a compact build and chromatic aberrations that lie within a specified range.

20 Claims, 6 Drawing Sheets

TUBE SYSTEM

CROSS-REFERENCE TO RELATED APPLICATIONS

This application claims benefit under 35 U.S.C. § 119 to German Application No. 10 2019 211 360.5, filed Jul. 30, 2019. The contents of this application is hereby incorporated by reference in its entirety.

FIELD

The disclosure relates to a tube system for a microscope. Additionally, the disclosure relates to a microscope having such a tube system.

BACKGROUND

WO 2005/088 378 A1 discloses a tube system for a microscope, in which the infinity space between the objective and the tube system is not been fully corrected. In this case, a change in the length of the infinity space can cause a change in the transverse chromatic aberration on account of not fully corrected longitudinal chromatic aberration and a change of coma and other monochromatic imaging aberrations. Moreover, a transverse chromatic aberration can occur on the optical axis of the tube system if the objective and the tube system are laterally offset from one another or if a plane plate made of glass is inserted into the infinity space at a tilt angle of 45°.

US 2010/172 029 A1 discloses a tube system in which the longitudinal chromatic aberration and the spherical aberration have been virtually fully corrected. The tube system has lenses made out of expensive glasses. The tube system has a relatively large build length and compensation of the transverse chromatic aberration is not used by the objective and tube system, which can lead to a complicated structure of the objectives and hence to higher costs.

SUMMARY

The disclosure seeks to provide an improved tube system for a microscope, such as one that has a variability of the infinity space.

In a general aspect, the disclosure provides a tube system for a microscope, including, as seen from an entry pupil: a first lens having a front vertex and a back vertex; a second lens having a front vertex and a back vertex; and a glass element. The tube system has a focal length (f') and an image height (l'). The distance between the front vertex of the first lens and the back vertex of the second lens is referred to as build length (BL). The lenses and the glass element lead to a longitudinal chromatic aberration (CHL) and a transverse chromatic aberration (CHV). BL/f'≤0.11. 0.43%≤CHL/f'≤−0.24%. −0.46%≤CHV/l'≤−0.31%.

The chromatic aberrations CHL, CHV can be calculated approximately for tube systems made of two cemented lenses or two individual lenses located close next to one another. This is based on the paraxial model. The magnitude of chromatic aberrations of the path through glass can likewise be determined theoretically. The formulas are compiled below.

Chromatic Aberration of Tube Lenses:

$$CHL_{F'-C'}/f'=-f'[1/(f_1 v_{e1})+1/(f_2 v_{e2})]$$

$$CHV_{F'-C'}/l'=-(UR-LP)[1/(f_1 v_{e1})+1/(f_2 v_{e2})]$$

where the following designations are used:
$CHL_{F'-C'}$: longitudinal chromatic aberration;
$CHV_{F'-C'}$: transverse chromatic aberration;
f': focal length of the tube system;
l': image height of the tube system;
f1: focal length of the first lens in air;
f2: focal length of the second lens in air;
$ve_1$: the Abbe number of the first lens with a reference wavelength of 546 nm;
$ve_2$: the Abbe number of the second lens with a reference wavelength of 546 nm;
UR: the length of the infinity space, defined by the distance between the objective contact surface (OAF) and the first lens vertex of the tube system; and
LP: the relative z-position of the entry pupil for the tube system in relation to the OAF (the same value of −15 mm is assumed for all exemplary embodiments, the negative value meaning that the entry pupil is located in front of the OAF).

Consequently, the value (UR−LP) represents the distance between the entry pupil and the first lens vertex of the tube system.

Chromatic Aberration of the Path Through Glass:

$$CHL_{F'-C'}/f'=[(n_e-1)/n_e^2]d/(f'v_e)$$

$$CHV_{F'-C'}/l'=-(f'-UR+LP)[(n_e-1)/n_e^2]d/(f'^2 v_e)$$

where
$n_e$ denotes the refractive index of the path through glass which follows the tube lenses, with a reference wavelength of 546 nm;
$v_e$ denotes the Abbe number of the path through glass which follows the tube lenses, with a reference wavelength of 546 nm;
and
d denotes the central thickness of the path through glass.

By summing the component of tube lenses and the path through glass, the entire chromatic aberration of the respective tube system is obtained. The calculation results according to the paraxial model and the real calculation of rays always have small deviations. Nevertheless, they provide information about the characteristic of the chromatic aberration.

Expressed differently, the tube system has a specified transverse chromatic aberration (CHV) and a specified longitudinal chromatic aberration (CHL).

For example, the tube system may include no further optical components, such as no further components with refractive power, for example no further lenses.

The tube system can have a simple and compact structure. The tube system can have a build length, as measured from the front vertex of the first lens to the back vertex of the second lens, which is no more than 11% of the focal length of the tube system. The minimum build length can be 4% of the focal length of the tube system.

The longitudinal chromatic aberration CHL and the transverse chromatic aberration CHV can be the aberrations, for example the differences, for the wavelengths F'=480 nm and C'=644 nm.

The tube system can have a field number of 25.

The tube system can have an image-side numerical aperture (NA') of 0.05.

According to an aspect of the disclosure, a ratio of the distance (UR−LP) between the entry pupil (EP) and the front vertex ($S_1 v$) of the first lens of the tube system to the focal length of same ranges between 0.5 and 1.3

$$(0.5 \leq (UR-LP)/f' \leq 1.3.$$

Here, UR denotes the length of the infinity space, defined by the distance between the objective contact surface and the first lens vertex of the tube system and LP denotes the relative z-position of the entry pupil of the tube system in relation to the objective contact surface.

According to one aspect of the disclosure, the lenses of the tube system can have refractive powers with opposite signs.

The tube system can include a positive and a negative lens.

According to an aspect of the disclosure, one of the lenses of the tube system can have a biconvex embodiment. For example, exactly one of the lenses of the tube system cab have a biconvex embodiment.

According to the disclosure, one of the lenses of the tube system can be embodied as a meniscus lens. It can have either a convex-concave or a concave-convex embodiment.

According to an aspect of the disclosure, the lenses of the tube system can be embodied as thin lenses. For example, the lenses of the tube system can have a thickness of no more than 10 mm (e.g., no more than 9 mm, no more than 8.5 mm, no more than 8.44 mm, no more than 7 mm, no more than 6.5 mm).

According to an aspect of the disclosure, the front vertex of the first lens and the back vertex of the second lens can have a convex embodiment.

According to an aspect of the disclosure, the two lenses of the tube system can be spaced apart by an air gap.

For example, the thickness of the air gap can be more than 4.75 mm (e.g., no more than 4.11 mm, no more than 1.2 mm, no more than 1.15 mm). In some embodiments, it can be at least 1.04 mm.

An air gap between the lenses of the tube system can be provided, for example, should the ratio of distance between the entry pupil and the first lens vertex of the tube system (UR−LP) to the focal length f′ of same be less than or equal to 0.7 or greater than or equal to 0.9, (UR−LP)/f′≤0.7 or (UR−LP)/f′≥0.9.

According to an aspect of the disclosure, the lenses of the tube system can form a cemented member. For example, they form a cemented doublet. For example, the two lenses of the tube system can be embodied as a cemented member, providing the following applies: 0.7≤(UR−LP)/f′≤1.0.

According to an aspect of the disclosure, the tube system can be corrected in view of spherical aberrations and/or coma up to a field number of 25 mm and for a maximum image-side numerical aperture NA' of 0.05.

For example, the tube system can be corrected in aplanatic fashion. For example, in some cases, the transverse spherical aberration on the optical axis for the aperture rate with NA'=0.045 at a wavelength of 546 nm is no more than ±0.008 mm. In some embodiments, the deviation from the Abbe sine condition is no more than ±0.0003 mm or ±0.03% in relation to the respective image height. Consequently, spherical aberration and coma can be virtually fully corrected.

The reference tube system according to WO 2005/088 378 A1 only contains one lens. According to the disclosure, the tube system can includes two or more lenses. Examples listed below have two lenses. As a result, there are additional degrees of freedom for eliminating or at least reducing more monochromatic imaging aberrations provided in the tube system disclosed herein compared to the tube system as per WO 2005/088 378 A1.

According to an aspect of the disclosure, spherical aberration and coma are removed in the tube system. Moreover, the tube system can have a reduced astigmatism and a reduced field curvature. Spherical aberration and coma can be removed; astigmatism and field curvature can be reduced. This clear sequence when correcting imaging aberrations originates from optical theory for stop displacement and corresponds to an aplanatic correction, and consequently forms a solid base for robustness and variability. Apart from the chromatic aberrations CHL, CHV and the field curvature, the tube system can have smaller monochromatic aberrations than the tube system known from US 2010/172029 A1.

It was found that the tube systems according to the disclosure have better optical properties, such as better imaging properties, than previously known tube systems. On account of the additional degrees of freedom due to the second lens, it is possible to eliminate or at least reduce monochromatic imaging aberrations. For example, it is possible to reduce (e.g., remove) spherical aberrations and/or coma and to reduce astigmatism and field curvature.

In some embodiments, a tube system according to the disclosure can have a particularly advantageous robustness. This should be understood to mean that they can be relatively insensitive in relation to lateral offset and/or tilting.

In some embodiments, a tube system according to the disclosure can have a particularly advantageous variability. This should be understood to mean the changeability of the length of the infinity space and/or the possibility of finding alternative solutions for greatly altered lengths (UR−LP).

In an aspect, the disclosure provides a microscope that includes a tube system as described herein. Features of such a microscope can correspond to those disclosed herein for the tube system included in the microscope.

BRIEF DESCRIPTION OF THE DRAWINGS

Features and details of the disclosure emerge from the description of exemplary embodiments with reference to the figures, in which.

DETAILED DESCRIPTION

Figure 11:
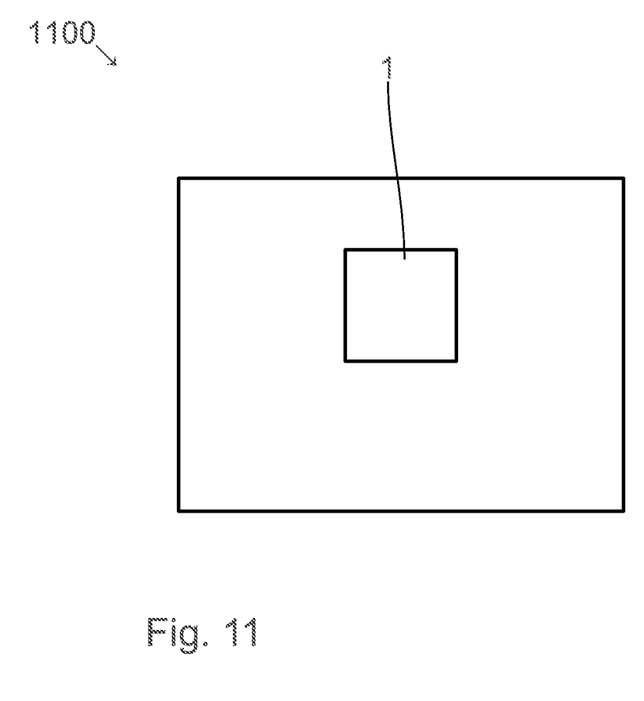
FIG. 11 shows a microscope including a tube system.

Different variants of a tube system 1 for a microscope are described below. Initially, general properties of the tube systems according to the disclosure are described. FIG. 11 depicts a microscope 1100 with a tube system 1.

The tube system 1 includes two tube lenses $L_1$, $L_2$ and a glass element G. The tube lenses $L_1$, $L_2$ have refractive power.

The glass element G has no refractive power. By way of example, it could be a deflection prism.

The object field of the tube system 1 is at infinity. The entry pupil EP of the tube system 1 is at LP, i.e., at a finite distance. LP represents the relative z-position of the entry pupil for the tube system in relation to the objective contact surface. The same value of −15 mm is assumed for all exemplary embodiments.

The true relative position of the entry pupil EP of the tube system 1 depends on the objective used. The examples illustrated below relate to a field number SFZ of 25 and an image-side numerical aperture NA' of 0.05.

According to the disclosure, it was recognized that it may be advantageous if the tube system 1 has a transverse chromatic aberration CHV, in particular $CHV_{F'-C'}$.

According to the disclosure, it was recognized that a certain value of a longitudinal chromatic aberration CHL, in particular $CHL_{F'-C'}$, is also advantageous should the tube system 1 have two lenses $L_1$, $L_2$, which either form a cemented member or should be disposed close next to one another. For example, this should mean that the two lenses are separated from one another by an air gap 2 with an extent along the direction of the optical axis oA of less than 5 mm.

The object-side lens $L_1$ has a front vertex $S_1v$. The image-side lens $L_2$ has a back vertex $S_2h$.

Below, the distance between the front vertex $S_1v$ of the first lens $L_1$ and the back vertex $S_2h$ of the second lens $L_2$ is referred to as a build length BL of the tube system 1. The tube system has a build length BL which is no more than 11% of the focal length f' of the tube system 1.

The tube system 1 is corrected in aplanatic fashion. It has a great robustness and a large variability.

The tube system 1 has an objective contact surface OAF. This surface defines the location where the objectives are anchored to the limb of the microscope.

The distance between the objective contact surface OAF and the front vertex $S_1v$ of the first lens $L_1$ of the tube system 1 is also referred to as a length UR of the infinity space.

In the variants of the tube system 1 illustrated below, the distance LP between the objective contact surface OAF and the entry pupil EP is −15 mm in each case. Here, the negative sign means that the entry pupil EP is located on the object side, i.e., in front of the objective contact surface OAF.

According to the disclosure, it was identified that, in some embodiments, the tube system 1 can have particularly advantageous properties if the chromatic aberrations satisfy the following boundary conditions:

$$-0.43\% \leq CHL/f' \leq -0.24\%$$ and $$-0.46\% \leq CHV/l' \leq -0.31\%.$$

Here, f' denotes the focal length of the tube system 1; l' denotes the image height of the tube system 1.

In certain embodiments, the chromatic aberrations respectively are the chromatic aberrations $CHL_{F'-C'}$ and $CHV_{F'-C'}$ for the wavelengths F'=480 nm and C'=644 nm.

The tube system 1 according to the disclosure has a compact build. In some embodiments, the build length is no more than 11% of the focal length of the tube system 1.

Advantageously, the distance between the entry pupil EP and the front vertex $S_1v$ of the first lens $L_1$ of the tube system 1 ranges between 0.5-times the focal length f' of the tube system 1 and 1.3-times the focal length f' of the tube system 1.

Should this distance be no more than 0.7-times the focal length f' of the tube system 1, it was found to be advantageous for the first lens $L_1$ to be embodied as a negative lens, i.e., as a lens with negative refractive power, and for the second lens $L_2$ to be embodied as a positive lens, i.e., as a lens with positive refractive power. In this case, the two lenses $L_1$, $L_2$ are spaced apart by an air gap.

Should the distance between the entry pupil EP and the front vertex $S_1v$ of the first lens $L_1$ be between 0.7-times and 1.0-times the focal length f' of the tube system 1, it was found to be advantageous for the lenses $L_1$, $L_2$ to be embodied as a cemented doublet, i.e., not to be separated by an air gap.

Should the distance between the entry pupil EP and the front vertex $S_1v$ of the first lens $L_1$ be greater than 0.9-times the focal length f' of the tube system 1, the first lens $L_1$ is preferably embodied as a positive lens, which is separated by an air gap from the second lens $L_2$, which is embodied as a negative lens. In this case, too, the first lens $L_1$ can be embodied as a negative lens and the second lens $L_2$ can be embodied as a positive lens.

Details of the optical design of the tube system 1 according to different variants are described below.

Figure 1:
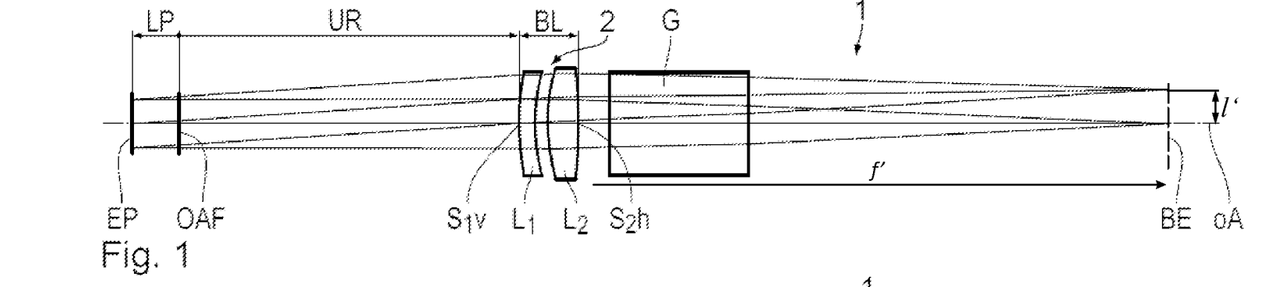
FIG. 1 schematically shows a longitudinal section through the optical constituent parts of a tube system according to a first variant, FIG. 2 schematically shows a longitudinal section through the optical constituent parts of a tube system according to a further variant, FIG. 3 schematically shows a longitudinal section through the optical constituent parts of a tube system according to a further variant.

Table 1 reproduces optical design data from the entry pupil EP to the image plane BE of the tube system 1 as per FIG. 1.

TABLE 1

| No. | Radius [mm] | Thickness [mm] | ne | ve | f' [mm] | Note |
|---|---|---|---|---|---|---|
| 1 | ∞ | | | | | EP |
| | | 15.00 | 1.000 | | | |
| 2 | ∞ | | | | | OAF |
| | | 110.00 | 1.000 | | | |
| 3 | 112.101 | | | | | |
| | | 4.87 | 1.75 | 35.1 | −230.3 | $L_1$ |
| 4 | 66.868 | | | | | |
| | | 4.11 | 1.000 | | | Air |
| 5 | 70.687 | | | | | |
| | | 10.00 | 1.50 | 66.8 | 101.8 | $L_2$ |
| 6 | −172.841 | | | | | |
| | | 10.00 | 1.000 | | | |
| 7 | ∞ | | | | | |
| | | 45.00 | 1.52 | 64.0 | | G |
| 8 | ∞ | | | | | |
| | | 136.82 | 1.000 | | | |
| 9 | ∞ | | | | | BE |

LP = −15.00 mm
UR = 110 mm
BL = 18.98 mm
$f_1'$ = −230.3 mm
$f_2'$ = 101.8 mm
$CHL_{F'-C'}/f'$ = −0.33%
$CHV_{F'-C'}/l'$ = −0.32%
BL/f' = 0.11
(UR-LP)/f' = 0.7
fl' = 180 mm
SFZ = 25
NA' = 0.05 ne denotes the refractive index of the respective optical element at a wavelength of 546 nm (e-line). ve denotes the Abbe number of the respective optical element at a wavelength of 546 nm (e-line).

FIG. 1 schematically illustrates the beam path in the corresponding tube system 1 from the entry pupil EP to the image plane BE. In this variant, the lenses L1, L2 are spaced apart by an air gap 2. The lens L1 is embodied as a negative lens. The lens L1 has a negative refractive power. The lens L2 is embodied as a positive lens. The lens L2 has a positive refractive power.

Figure 2:
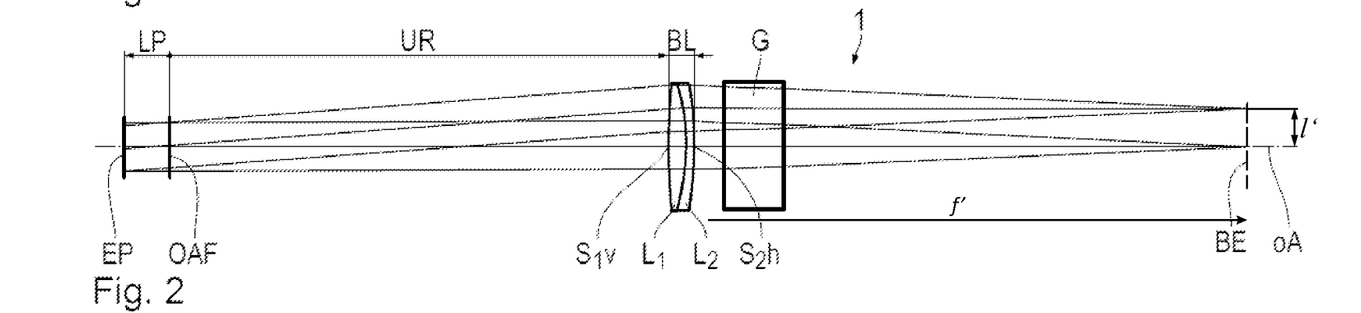

Table 2 reproduces optical design data of the tube system 1 as per FIG. 2.

TABLE 2

| No. | Radius [mm] | Thickness [mm] | ne | ve | f' [mm] | Note |
|---|---|---|---|---|---|---|
| 1 | ∞ | | | | | EP |
| | | 15.00 | 1.000 | | | |
| 2 | ∞ | | | | | OAF |
| | | 165.00 | 1.000 | | | |
| 3 | 161.845 | | | | | |
| | | 6.50 | 1.49 | 70.2 | 96.1 | $L_1$ |
| 4 | −65.407 | | | | | |
| | | 2.40 | 1.66 | 39.5 | −206.9 | $L_2$ |
| 5 | −127.725 | | | | | |
| | | 10.00 | 1.000 | | | |
| 6 | ∞ | | | | | |
| | | 20.00 | 1.52 | 64.0 | | G |
| 7 | ∞ | | | | | |
| | | 154.25 | 1.000 | | | |
| 8 | ∞ | | | | | BE |

LP = −15.00 mm
UR = 165.00 mm
BL = 8.9 mm
$f_1'$ = 96.1 mm
$f_2'$ = −206.9 mm
$CHL_{F-C}/f'$ = −0.42%
$CHV_{F-C}/l'$ = −0.46%
BL/f' = 0.05
(UR−LP)/f' = 1.0
fl' = 180 mm
SFZ = 25
NA' = 0.05

In this variant of the tube system 1, the lenses $L_1$ and $L_2$ are embodied as a cemented doublet. The lens L1 has a positive refractive power. The lens L2 has a negative refractive power. The lenses L1 and L2 are in contact in the region of a cemented face.

Figure 3:
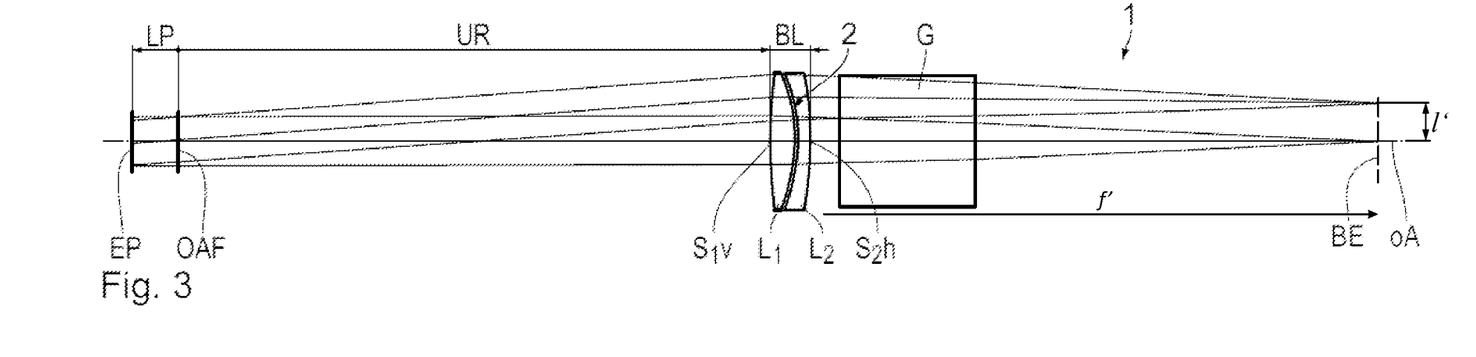

Table 3 reproduces optical design data of the tube system 1 as per FIG. 3.

TABLE 3

| No. | Radius [mm] | Thickness [mm] | ne | ve | f' [mm] | Note |
|---|---|---|---|---|---|---|
| 1 | ∞ | | | | | EP |
| | | 15.00 | 1.000 | | | |
| 2 | ∞ | | | | | OAF |
| | | 195.00 | 1.000 | | | |
| 3 | 129.934 | | | | | |
| | | 8.50 | 1.49 | 70.2 | 85.7 | $L_1$ |
| 4 | −60.540 | | | | | |
| | | 1.04 | 1.000 | | | Air |
| 5 | −60.450 | | | | | |
| | | 4.00 | 1.64 | 42.2 | −161.3 | $L_2$ |
| 6 | −149.233 | | | | | |
| | | 10.00 | 1.000 | | | |
| 7 | ∞ | | | | | |
| | | 45.00 | 1.52 | 64.0 | | G |
| 8 | ∞ | | | | | |
| | | 133.66 | 1.000 | | | |
| 9 | ∞ | | | | | BE |

LP = −15.00 mm
UR = 195.00 mm
BL = 13.54 mm
$f_1'$ = 85.7 mm
$f_2'$ = −161.3 mm
$CHL_{F-C}/f'$ = −0.26%
$CHV_{F-C}/l'$ = −0.39%
BL/f' = 0.08
(UR−LP)/f' = 1.2
fl' = 180 mm
SFZ = 25
NA' = 0.05

In this variant, the lenses L1, L2 are spaced apart by an air gap 2. The lens L1 is embodied as a positive lens. The lens L1 has a positive refractive power. The lens L2 is embodied as a negative lens. The lens L2 has a negative refractive power.

Further variants of the tube system 1 are summarized in Tables 4 to 8.

TABLE 4

| No. | Radius [mm] | Thickness [mm] | ne | ve | f' [mm] | Note |
|---|---|---|---|---|---|---|
| 1 | ∞ | | | | | EP |
| | | 15.00 | 1.000 | | | |
| 2 | ∞ | | | | | OAF |
| | | 150.00 | 1.000 | | | |
| 3 | 196.584 | | | | | |
| | | 5.50 | 1.50 | 81.1 | 104.0 | $L_1$ |
| 4 | −69.775 | | | | | |
| | | 3.00 | 1.67 | 46.9 | −225.2 | $L_2$ |
| 5 | −131.462 | | | | | |
| | | 10.00 | 1.000 | | | |
| 6 | ∞ | | | | | |
| | | 20.00 | 1.52 | 64.0 | | G |
| 7 | ∞ | | | | | |
| | | 169.93 | 1.000 | | | |
| 8 | ∞ | | | | | BE |

LP = −15.00 mm
UR = 150.00 mm
BL = 8.5 mm
$f_1'$ = 104.0 mm
$f_2'$ = −225.2 mm
$CHL_{F-C}/f'$ = −0.43%
$CHV_{F-C}/l'$ = −0.40%
BL/f' = 0.04
(UR−LP)/f' = 0.8
fl' = 195 mm
SFZ = 25
NA' = 0.05

TABLE 5

| No. | Radius [mm] | Thickness [mm] | ne | ve | f' [mm] | Note |
|---|---|---|---|---|---|---|
| 1 | ∞ | | | | | EP |
| | | 15.00 | 1.000 | | | |
| 2 | ∞ | | | | | OAF |
| | | 215.00 | 1.000 | | | |
| 3 | 126.657 | | | | | |
| | | 9.00 | 1.49 | 70.2 | 85.5 | $L_1$ |
| 4 | −61.013 | | | | | |
| | | 1.15 | 1.000 | | | Air |
| 5 | −60.784 | | | | | |
| | | 4.00 | 1.64 | 42.2 | −160.0 | $L_2$ |
| 6 | −152.883 | | | | | |
| | | 10.00 | 1.000 | | | |
| 7 | ∞ | | | | | |
| | | 45.00 | 1.52 | 64.0 | | G |
| 8 | ∞ | | | | | |
| | | 133.11 | 1.000 | | | |
| 9 | ∞ | | | | | BE |

LP = −15.00 mm
UR = 215.00 mm
BL = 14.15 mm
$f_1'$ = 85.5 mm
$f_2'$ = −160.0 mm
$CHL_{F-C}/f'$ = −0.24%
$CHV_{F-C}/l'$ = −0.40%
BL/f' = 0.08
(UR−LP)/f' = 1.3
fl' = 180 mm
SFZ = 25
NA' = 0.05

TABLE 6

| No. | Radius [mm] | Thickness [mm] | ne | ve | f' [mm] | Note |
|---|---|---|---|---|---|---|
| 1 | ∞ | | | | | EP |
| | | 15.00 | 1.000 | | | |
| 2 | ∞ | | | | | OAF |
| | | 90.00 | 1.000 | | | |
| 3 | 125.545 | | | | | |
| | | 2.00 | 1.74 | 32.0 | −312.4 | L$_1$ |
| 4 | 80.935 | | | | | |
| | | 4.75 | 1.000 | | | Air |
| 5 | 88.172 | | | | | |
| | | 8.44 | 1.50 | 66.8 | 121.8 | L$_2$ |
| 6 | −189.903 | | | | | |
| | | 10.00 | 1.000 | | | |
| 7 | ∞ | | | | | |
| | | 80.00 | 1.52 | 64.0 | | G |
| 8 | ∞ | | | | | |
| | | 131.04 | 1.000 | | | |
| 9 | ∞ | | | | | BE |

LP = −15.00 mm
UR = 90.00 mm
BL = 15.19 mm
f1' = −312.4 mm
f2' = 121.8 mm
CHL$_{F'-C'}$/f' = −0.31%
CHV$_{F'-C'}$/l' = −0.31%
BL/f' = 0.08
(UR-LP)/f' = 0.5
f1' = 195 mm
SFZ = 25
NA' = 0.05

TABLE 7

| No. | Radius [mm] | Thickness [mm] | ne | ve | f' [mm] | Note |
|---|---|---|---|---|---|---|
| 1 | ∞ | | | | | EP |
| | | 15.00 | 1.000 | | | |
| 2 | ∞ | | | | | OAF |
| | | 130.00 | 1.000 | | | |
| 3 | 154.192 | | | | | |
| | | 4.00 | 1.68 | 37.9 | −176.5 | L$_1$ |
| 4 | 66.619 | | | | | |
| | | 7.00 | 1.59 | 61.0 | 92.1 | L$_2$ |
| 5 | −286.856 | | | | | |
| | | 10.00 | 1.000 | | | |
| 6 | ∞ | | | | | |
| | | 90.00 | 1.52 | 64.0 | | G |
| 7 | ∞ | | | | | |
| | | 120.83 | 1.000 | | | |
| 8 | ∞ | | | | | BE |

LP = −15.00 mm
UR = 130.00 mm
BL = 11 mm
f1' = −176.5 mm
f2' = 92.1 mm
CHLF'-C'/f' = −0.39%
CHVF'-C'/l' = −0.45%
BL/f' = 0.06
(UR-LP)/f' = 0.7
f1' = 195 mm
SFZ = 25
NA' = 0.05

TABLE 8

| No. | Radius [mm] | Thickness [mm] | ne | ve | f' [mm] | Note |
|---|---|---|---|---|---|---|
| 1 | ∞ | | | | | EP |
| | | 15.00 | 1.000 | | | |
| 2 | ∞ | | | | | OAF |
| | | 155.00 | 1.000 | | | |

TABLE 8-continued

| No. | Radius [mm] | Thickness [mm] | ne | ve | f' [mm] | Note |
|---|---|---|---|---|---|---|
| 3 | 121.921 | | | | | |
| | | 2.50 | 1.66 | 39.5 | −204.8 | L$_1$ |
| 4 | 63.494 | | | | | |
| | | 1.20 | | | | Air |
| 5 | 63.861 | | | | | |
| | | 10.00 | 1.49 | 70.2 | 100.5 | L$_2$ |
| 6 | −202.192 | | | | | |
| | | 10.00 | 1.000 | | | |
| 7 | ∞ | | | | | |
| | | 0.00 | 1.52 | 64.0 | | G |
| 8 | ∞ | | | | | |
| | | 180.76 | 1.000 | | | |
| 9 | ∞ | | | | | BE |

LP = −15.00 mm
UR = 155.00 mm
BL = 14 mm
f1' = −204.8 mm
f2' = 100.5 mm
CHL$_{F'-C'}$/f' = −0.35%
CHV$_{F'-C'}$/l' = −0.31%
BL/f' = 0.07
(UR-LP)/f' = 0.9
f1' = 195 mm
SFZ = 25
NA' = 0.05

FIGS. 4 to 10 illustrate aberrations for the variant as per FIG. 2 in exemplary fashion.

Figure 4:
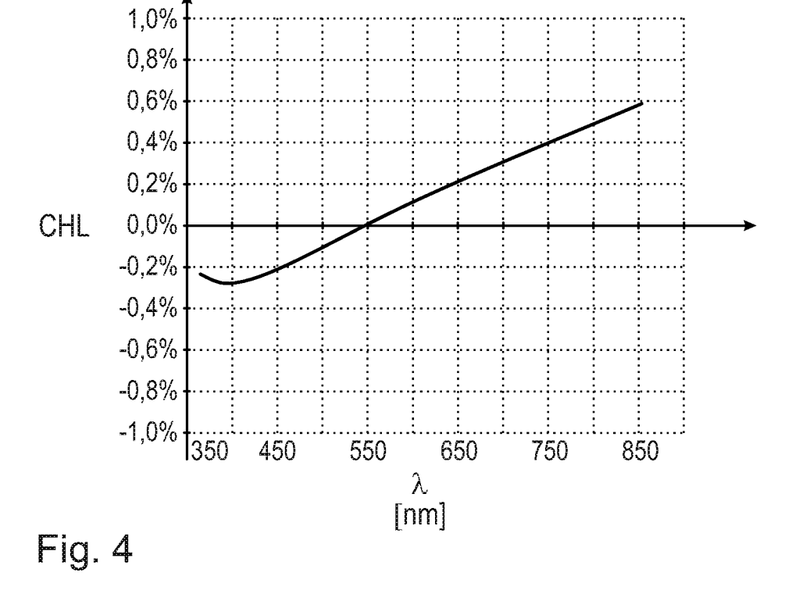
FIG. 4 shows an illustration of the dependence of the longitudinal chromatic aberration in relation to the focal length of the tube system, as a function of the wavelength.

Here, FIG. 4 illustrates the longitudinal chromatic aberration CHL in relation to the focal length f' with respect to a primary wavelength of 546 nm.

Figure 5:
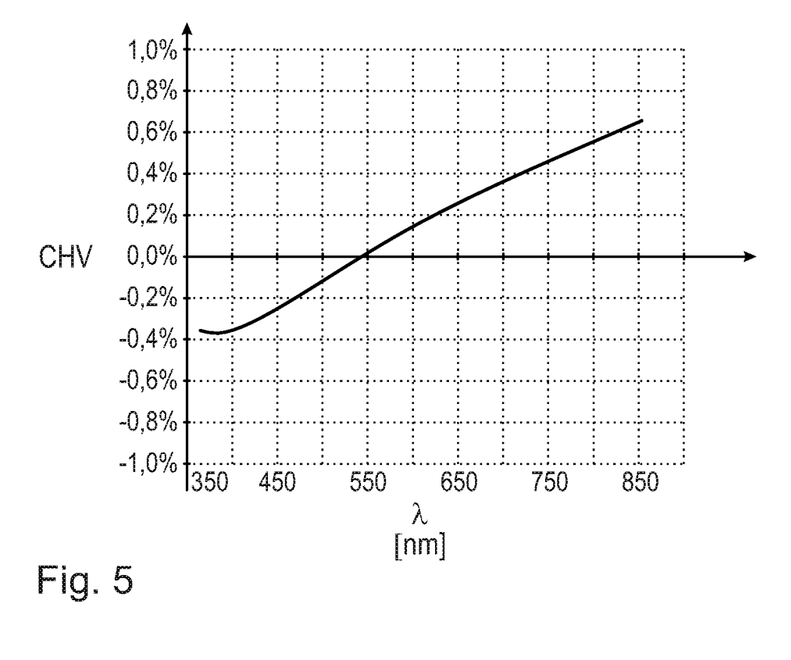
FIG. 5 shows an illustration of the dependence of the transverse chromatic aberration in relation to the image height of the tube system, as a function of the wavelength.

Here, FIG. 5 illustrates the transverse chromatic aberration CHV in relation to the image height l' with respect to a primary wavelength of 546 nm.

Figure 6:
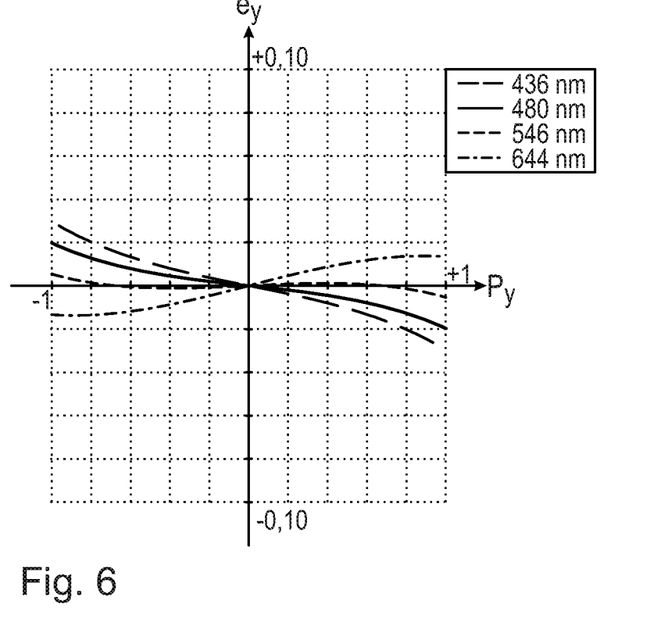
FIG. 6 shows transverse spherical aberrations as a function of pupil coordinates on the optical axis.
Figure 7:
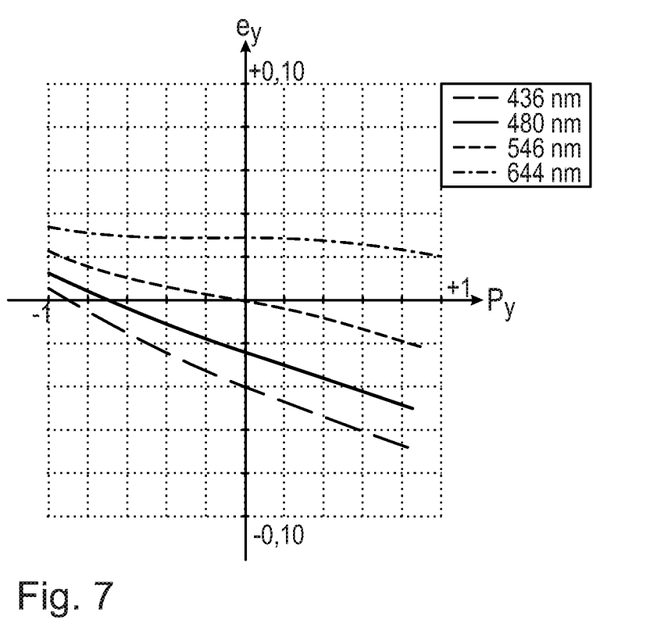
FIG. 7 shows transverse spherical aberrations as a function of pupil coordinates for an image height of 12.5 mm in a tangential section.
Figure 8:
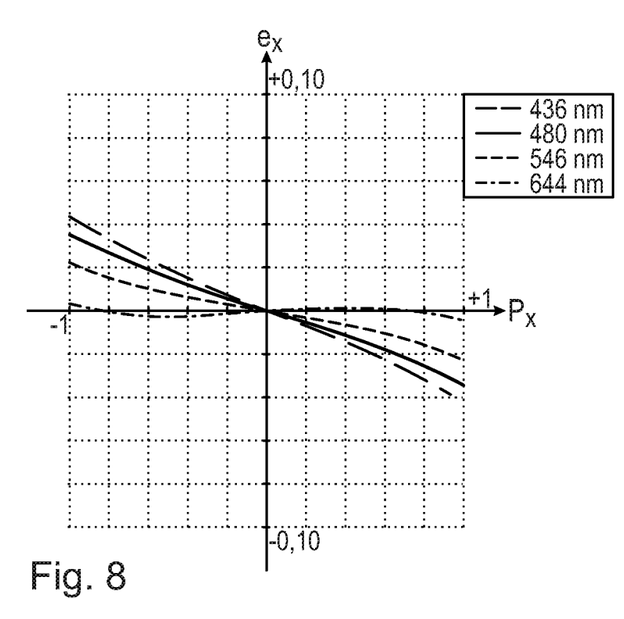
FIG. 8 shows transverse spherical aberrations as a function of pupil coordinates for an image height of 12.5 mm in a sagittal section.

FIGS. 6 to 8 illustrate transverse aberrations depending on the aperture for four different wavelengths, an image-side numerical aperture of NA'=0.045 being assumed. Here, FIG. 6 shows the transverse spherical aberration on the axis, FIG. 7 shows the transverse aberrations for an image height of 12.5 mm in a tangential section and FIG. 8 shows the transverse aberration for an image height of 12.5 mm in a sagittal section.

Figure 9:
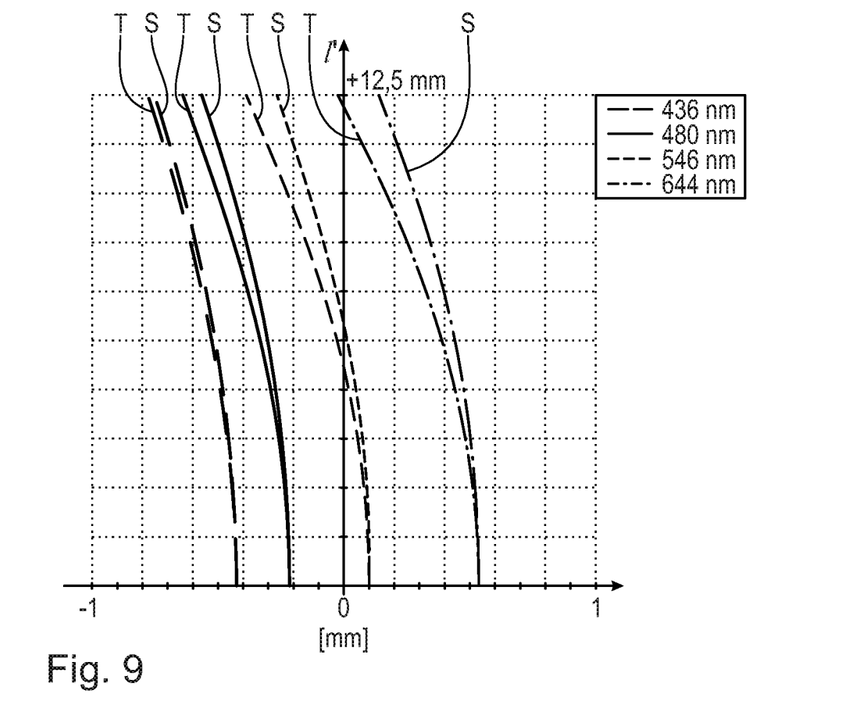
FIG. 9 shows field curvature and astigmatism in the tangential and sagittal section.

FIG. 9 plots the field curvature and the astigmatism as a function of the image height for four different wavelengths.

Figure 10:
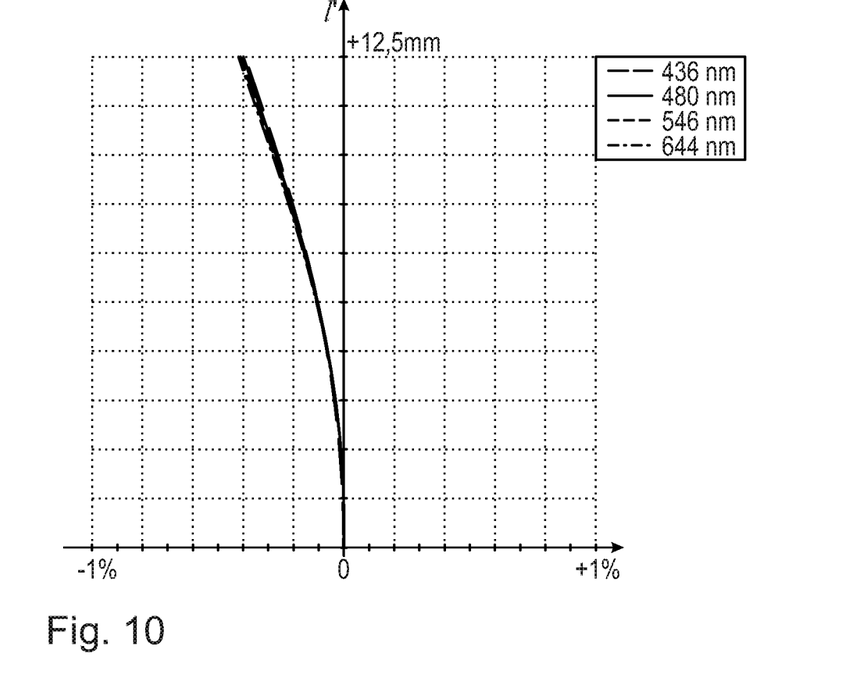
FIG. 10 shows the distortion as a function of the image height l'.

FIG. 10 plots the distortion (in %) as a function of the image height.

What is claimed is:

1. A tube system, comprising as seen from an entry pupil:
a first lens having a front vertex and a back vertex;
a second lens having a front vertex and a back vertex; and
a glass element,
wherein:
the tube system has a focal length (f') and an image height (l');
the tube system has a build length (BL) which is a distance between the front vertex of the first lens and the back vertex of the second lens;
the first lens, the second lens and the glass element lead to a longitudinal chromatic aberration (CHL$_{F'-C'}$) and a transverse chromatic aberration (CHV$_{F'-C'}$), where F' is a wavelength of 480 nanometers and C' is a wavelength of 644 nanometers;

(BL/f')≤0.11;

−0.43%≤(CHL$_{F'-C'}$/f')≤−0.24%; and

−0.46%≤(CHV$_{F'-C'}$/l')≤−0.31%.

2. The tube system of claim 1, wherein:
(UR-LP) is a distance between the entry pupil and the front vertex of the first lens; and
((UR-LP)/f) is between 0.5 and 1.3.

3. The tube system of claim 1, wherein:
the first lens as a first refractive power with a first sign;
the second refractive lens has a second refractive power with a second sign; and
the first sign is opposite to the second sign.

4. The tube system of claim 1, wherein the first lens is biconvex.

5. The tube system of claim 1, wherein the first lens is a meniscus lens.

6. The tube system of claim 1, wherein the first lens is at most 10 mm thick.

7. The tube system of claim 6, wherein the second lens is at most 10 mm thick.

8. The tube system of claim 1, wherein the front vertex of the first lens is convex, and the back vertex of the second lens is convex.

9. The tube system of claim 1, wherein the first lens is spaced from the second lens by an air gap.

10. The tube system of claim 9, wherein the first lens and the second lens define a cemented member.

11. The tube system of claim 1, wherein the tube system is correctable in view of spherical aberration, coma or both the spherical aberration and coma up to a field number of 25 mm and for a maximum image-side numerical aperture of 0.05.

12. The tube system of claim 1, wherein:
(UR-LP) is a distance between the entry pupil and the front vertex of the first lens;
((UR-LP)/f) is between 0.5 and 1.3,
the first lens as a first refractive power with a first sign;
the second refractive lens has a second refractive power with a second sign; and
the first sign is opposite to the second sign.

13. The tube system of claim 12, wherein at least one lens selected from the group consisting of the first lens and the second lens is biconvex.

14. The tube system of claim 13, wherein at least one lens selected from the group consisting of the first lens and the second lens is a meniscus lens.

15. The tube system of claim 14, wherein at least one lens selected from the group consisting of the first lens and the second lens is at most 10 mm thick.

16. The tube system of claim 15, wherein the first lens is spaced from the second lens by an air gap.

17. The tube system of claim 16, wherein the first lens and the second lens define a cemented member.

18. The tube system of claim 1, wherein:
(UR-LP) is a distance between the entry pupil and the front vertex of the first lens;
((UR-LP)/f) is between 0.5 and 1.3; and
the first lens is spaced from the second lens by an air gap.

19. The tube system of claim 1, wherein:
the first lens as a first refractive power with a first sign;
the second refractive lens has a second refractive power with a second sign; and
the first sign is opposite to the second sign; and
the first lens is spaced from the second lens by an air gap.

20. A microscope, comprising:
a tube system according to claim 1.

* * * * *

UNITED STATES PATENT AND TRADEMARK OFFICE
CERTIFICATE OF CORRECTION

PATENT NO. : 11,681,134 B2
APPLICATION NO. : 16/934862
DATED : June 20, 2023
INVENTOR(S) : Renhu Shi et al.

It is certified that error appears in the above-identified patent and that said Letters Patent is hereby corrected as shown below:

In the Specification

Under BACKGROUND:

Column 1, Line 19, delete "2005/088 378" insert -- 2005/088378 --.

Column 1, Line 31, delete "2010/172 029" insert -- 2010/172029 --.

Column 3, Line 64, delete "2005/172 378" insert -- 2005/088378 --.

Column 4, Line 61, delete "height l'." insert -- height l', --.

Signed and Sealed this
Eighth Day of August, 2023

Katherine Kelly Vidal
*Director of the United States Patent and Trademark Office*